(12) United States Patent
Dowhan

(10) Patent No.: US 7,750,530 B2
(45) Date of Patent: Jul. 6, 2010

(54) OUTSIDE ROTOR ELECTRIC MACHINE WITH REDUCED AIR GAP VARIATION

(75) Inventor: Michael Dowhan, Milton (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 284 days.

(21) Appl. No.: 11/749,231

(22) Filed: May 16, 2007

(65) Prior Publication Data

US 2008/0284275 A1 Nov. 20, 2008

(51) Int. Cl.
*H02K 1/22* (2006.01)
(52) U.S. Cl. ........................................ 310/265
(58) Field of Classification Search .............. 310/265, 310/201, 179, 180, 207, 208, 216
See application file for complete search history.

(56) References Cited

U.S. PATENT DOCUMENTS

| | | | |
|---|---|---|---|
| 6,313,560 B1 | 11/2001 | Dooley | |
| 6,664,705 B2 | 12/2003 | Dooley | |
| 6,873,071 B2 | 3/2005 | Dooley | |
| 6,920,023 B2 | 7/2005 | Dooley | |
| 6,936,948 B2 | 8/2005 | Bell et al. | |
| 6,965,183 B2 * | 11/2005 | Dooley | 310/201 |
| 7,098,561 B2 | 8/2006 | Dooley | |
| 7,119,461 B2 | 10/2006 | Dooley | |
| 7,119,467 B2 | 10/2006 | Dooley | |
| 7,126,313 B2 | 10/2006 | Dooley | |
| 2008/0088195 A1 | 4/2008 | Dooley | |

* cited by examiner

*Primary Examiner*—Javaid Nasri
(74) *Attorney, Agent, or Firm*—Ogilvy Renault LLP

(57) ABSTRACT

A method of providing an outside rotor electric machine having a reduced radial air gap variation across an axial length of the air gap, the machine including a rotor having a cylindrical elongated portion supporting magnets and a flange extending at least partially radially from a rotating shaft, the method comprising increasing a radial deflection of the elongated portion in proximity of the flange by connecting the elongated portion to the flange through a radial spring having a stiffness lower than that of the elongated portion.

18 Claims, 3 Drawing Sheets

OUTSIDE ROTOR ELECTRIC MACHINE WITH REDUCED AIR GAP VARIATION

TECHNICAL FIELD

The invention relates generally to electric machines such as generators and motors and, more particularly, to an improved outside rotor electric machine and related method.

BACKGROUND OF THE ART

Typical rotors for outside rotor electric machines usually include a retaining ring which retains the magnets and is connected to the rotating shaft through a flange. Due to increased rotor speed and thermal deflections, the retaining ring tends to undergo a radial displacement which increases the air gap between the rotor and stator. Because the retaining ring is generally stiffer in proximity of the flange, the radial displacement is generally greater axially away from the flange than in proximity thereof. As such, during use the retaining ring usually tends to adopt a somewhat conical shape. Such deformation generally makes it difficult to appropriately size the air gap, and can lead to magnet cracks due to unequal support of the magnets. In addition, as the retaining ring deflects in a conical manner, the magnets can become inclined enough such as to produce an axial force which pushes the magnets out of their position on the retaining ring.

Accordingly, improvements are desirable.

SUMMARY

It is therefore an object to provide a method of reducing a variation of an air gap of an outside rotor electric machine.

In one aspect, there is provided a method of providing an outside rotor electric machine having a reduced radial air gap variation across an axial length of the air gap, the machine including a rotor having a cylindrical elongated portion supporting magnets and a flange extending at least partially radially from a rotating shaft, the method comprising increasing a radial deflection of the elongated portion in proximity of the flange by connecting the elongated portion to the flange through a radial spring having a stiffness lower than that of the elongated portion, such that a variation of the radial deflection throughout the length is maintained below a predetermined value when the rotor rotates at a maximum speed.

In another aspect, there is provided a method of reducing a variation of a radial air gap in an outside rotor electric machine across a length of the air gap during use, the machine including a rotor having a cylindrical elongated portion supporting magnets and a flange extending at least partially radially from a rotating shaft, the elongated portion having a free end and an opposed connected end connected to the flange, the method comprising increasing a flexibility of the connection between the connected end and the flange until a difference between a radial deflection of the elongated portion in proximity of the connected end and the radial deflection of the elongated portion in proximity of the free end when the rotor rotates at a maximum speed is within a predetermined range.

In a further aspect, there is provided a method of decreasing a conicity of a radial deflection of an outside rotor of an electric machine during use, the rotor including a cylindrical elongated portion supporting magnets and a flange extending at least partially radially from a rotating shaft, the method comprising increasing a flexibility of a connection between the elongated portion and the flange until a radial deflection of the elongated portion in proximity of the flange is within a predetermined limit of the radial deflection of the elongated portion at an end thereof opposite of the flange when the rotor rotates at a maximum speed.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
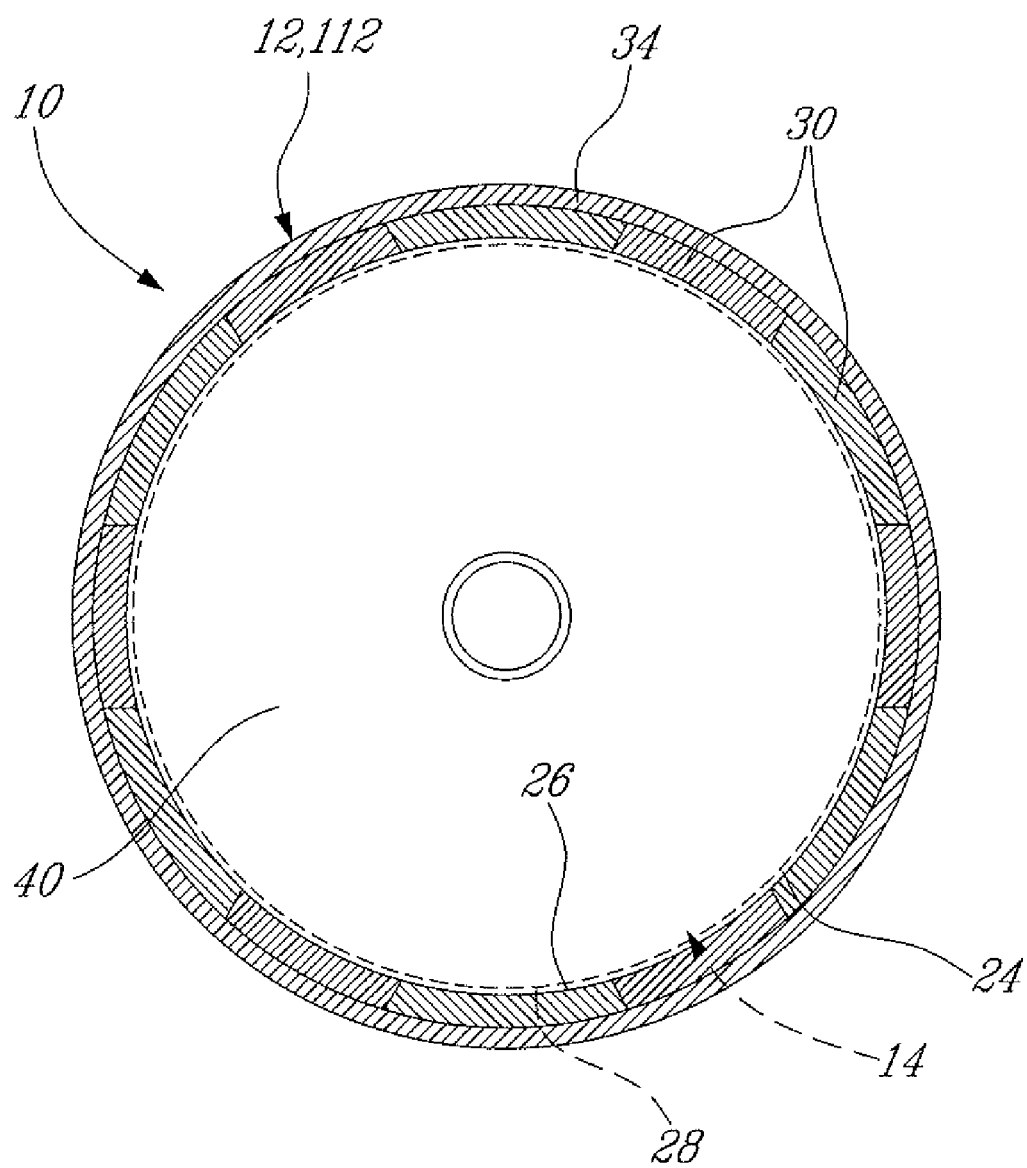
FIG. 1 is a partial transverse cross-sectional view of an outside rotor electric machine.

Referring to the Figures, an electric machine according to a particular aspect of the present invention is generally shown at 10. The machine 10 has an "outside rotor" configuration, i.e. the machine comprises a rotor 12 which surrounds a stator 14.

The stator 14 is schematically shown in dotted lines, and may be any appropriate type of stator, including, but not limited to, a stator such as described in U.S. Pat. No. 6,965,183, issued Nov. 15, 2005 to Dooley, and which is incorporated herein by reference. A rotor air gap 24, radially defined between a circumferential inner surface 26 of the rotor 12 and an outer surface 28 of the stator 14, separates the rotor 12 and stator 14.

Referring to FIG. 1, the rotor 12 generally comprises an array of abutting magnets 30, which in the embodiment shown are permanent magnets, forming alternating poles. The magnets 30 are retained by a retaining ring 34. As such, the magnets 30 define the cylindrical inner surface 26 of the rotor 12.

In an alternate embodiment which is not shown, the magnets 30 are circumferentially spaced apart, each magnet 30 being received between and abutting adjacent spacers forming part of a non-magnetic yoke (in the present specification, "non-magnetic" is also intended to comprise elements that may have some, but negligible, magnetic capability relative to the magnets 30), such that the magnets 30 and yoke together define the cylindrical inner surface 26 of the rotor 12.

The retaining ring 34 comprises a magnetic material in order to complete a magnetic path between the magnets 30 with a minimum path length and as such maximize the magnetic flux density in the rotor air gap 24, which is radially defined between the stator 14 and the rotor 12. The materials for the rotor 12 may be any deemed suitable by the designer, and may include in a particular embodiment samarium cobalt for the permanent magnets 30 and maraging steel for the retaining ring 34.

Figure 2:
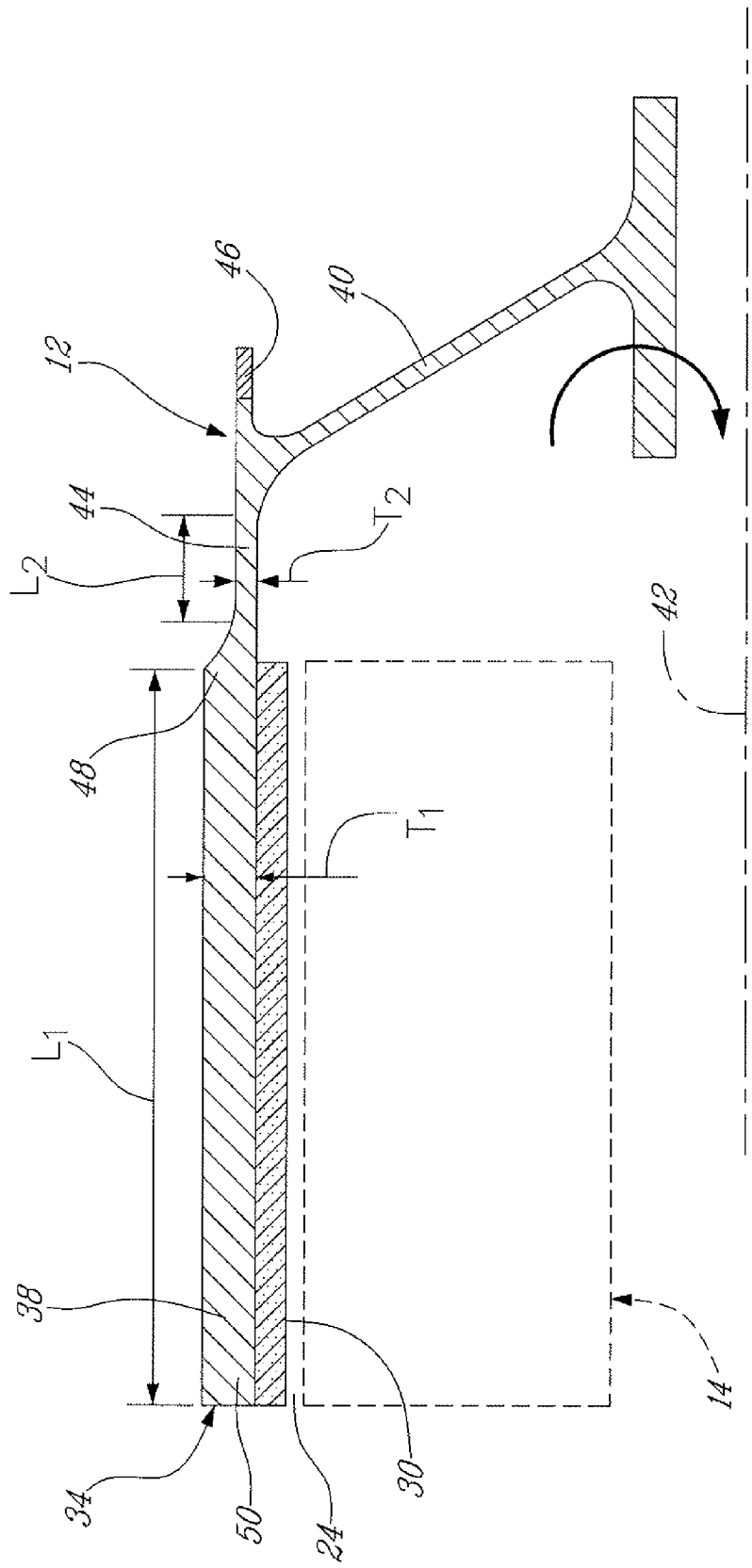
FIG. 2 is a partial longitudinal cross-sectional view of the machine of FIG. 1 according to a particular aspect of the present invention.

Referring to FIG. 2, the retaining ring 34 comprises a cylindrical elongated portion 38 having a substantially constant thickness (T1) and overlying the magnets 30 (or the yoke and magnets in an embodiment including a yoke as described above). The elongated portion 38 has an inside surface sized to match the circumference defined by the abutting magnets 30 such as to retain the magnets 30 therein, which in a particular embodiment are inserted one by one within the retaining ring 34.

The rotor 12 also comprises an attachment flange 40 extending inwardly from the retaining ring 34 to engage driving and/or drivable means such as a rotating shaft, which is represented by an axis of rotation 42. The attachment flange 40 extends at least partially radially with respect to the axis of rotation 42, and is shown here as a substantially conical flange. Alternate flange geometries are also possible, including for example a flange extending completely radially with respect to the rotating shaft or axis 42 (i.e. being substantially perpendicular thereto).

The retaining ring 34 also comprises a radial spring 44 or reduced stiffness portion 44-interconnecting the elongated portion 38 and the flange 40. Radial spring 44 will herein be referred to alternatively as reduced thickness portion 44. Therefore it should be noted that the radial spring 44 and the reduced thickness portion 44 consist of the same part. The radial spring 44 has a stiffness which is lower than that of the elongated portion 38, thus increasing the flexibility of the connection between the elongated portion 38 and the flange 40 (i.e. by comparison with a direct connection between the elongated portion 38 and flange 40). The radial spring 44 thus absorbs a portion of the strain transferred by the flange 40, which allows the radial deformation of the elongated portion 38 in proximity of its end 48 connected the radial spring 44 to be more similar to its radial deformation in proximity to its opposed free end 50. As such, the conicity of the radial deflection of the elongated portion 38 is reduced, i.e. the elongated portion 38 deforms more like a cylinder and less like a cone, allowing the radial displacement during use, and as such the variation of the air gap 24, to be more constant along an axial direction of the rotor 12, i.e. over the length of the elongated portion 38 (and as such of the air gap 24). This in turn allows the air gap 24 to be computed with improved precision, and reduces the risk of the magnets 30 sliding out of engagement with the retaining ring 34.

In a particular embodiment, an axial stop (not shown), which can be for example in the form of a split ring, is provided to further prevent the magnets 30 from moving axially, and can be for example attached to or included in the radial spring 44.

In the embodiment shown, the radial spring 44 is provided in the form of a cylindrical reduced thickness portion (relative to the thickness of the elongated portion 38) which interconnects the elongated portion 38 and the flange 40. This radial spring 44 will therefore herein be referred to alternatively as reduced thickness portion 44 The length (i.e. axial) and thickness (i.e. radial) of the reduced thickness portion 44 may be determined by finite element analysis considering stresses and distribution of mass in a dynamic representation of the rotor 12, and varies as a function of the stiffness of the flange 40 and of the retaining ring 34. The length $L_2$ and thickness $T_2$ of the reduced thickness portion 44 is set such as to obtain a predetermined variation of the radial deflection over the length $L_1$ of the elongated portion 38. In one possible embodiment, the predetermined variation of the radial deflection is between about 0.001 inch and about 0.003 inch, and preferably between about 0.001 inch and about 0.002 inch.

In a particular embodiment, the reduced thickness portion 44 has a length $L_2$ of less than about 25% of the length $L_1$ of the elongated portion and a thickness $T_2$ of between about one half (½) and about one third (⅓) of the thickness $T_1$ of the elongated portion, and the variation of the radial deflection over the length $L_1$ of the elongated portion is maintained between 0.001 inch and 0.002 inch at the maximum speed of the rotor 12, which in this particular embodiment is approximately 36 000 RPM.

The retaining ring 34 further optionally comprises a counterweight balance rim 46, which axially extends from the flange 40 opposite to the elongated portion 38. The counterweight 46 is used to improve the balance of the rotor 12 during rotation.

Figure 3:
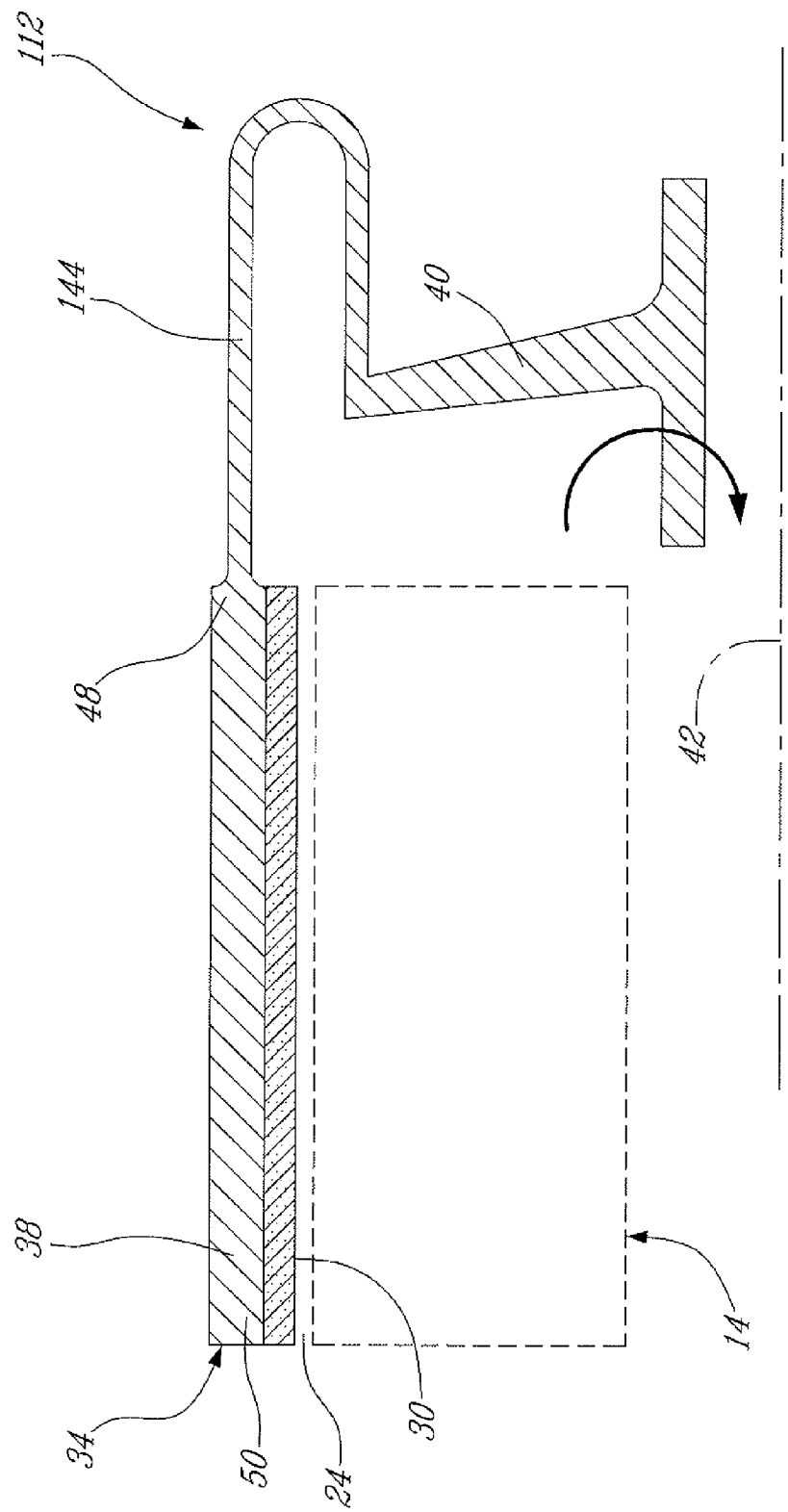
FIG. 3 is a partial longitudinal cross-sectional view of the machine of FIG. 1 according to an alternate aspect of the present invention.

Referring to FIG. 3, a rotor 112 according to an alternate aspect of the present invention is shown. The rotor 112 is similar to the rotor 12 previously described, with the exception that the radial spring 144 is provided in the form of a hairpin, or axially oriented U-shaped portion, interconnecting the elongated portion 38 and the flange 40. The hairpin 144 has the advantage of providing a greater flexibility for the connection between the elongated portion 38 and the flange 40, however generally increases the necessary space for the rotor 112.

In another alternate embodiment which is not shown, the radial spring is provided in the form of a notched cylindrical portion interconnecting the elongated portion and the flange. The notched cylindrical portion is relatively easy to manufacture, but may generally introduce stress concentrations in proximity of the notch which are more or less substantial according to the geometry, size and rotation speed of the rotor.

As is the case for conventional permanent magnet machines, the machine 10 may operate in a generator mode or a motor mode. When operated in a generator mode, an external torque source forces rotation of the rotating shaft and flange 40 (and thus the rotor 12, 112 and the magnets 30), and the interaction of the magnets 30 and the stator 14 causes a magnetic flux to loop therein. As the rotor 12, 112 rotates, the magnetic flux in the stator 14 changes, and this changing flux results in an output current that can be used to power electrical devices, or be stored for later use. When operated in a motor mode, a voltage from an external source is applied to the stator 14 which causes current flow therein and results in a magnetic flux to be set up in a magnetic circuit therein. When current is supplied in an appropriate manner to the stator 14, the rotor 12, 112 can be made to rotate and thus produce usable torque through the flange 40 rotating the shaft.

The above description is meant to be exemplary only, and one skilled in the art will recognize that changes may be made to the embodiments described without department from the scope of the invention disclosed. For example, the radial spring can be used with outside rotors having a different geometry than the rotors described herein, including rotors having different types of magnets, e.g. electromagnets. The radial spring can also take any alternate adequate form providing adequate flexibility to the connection between the elongated portion and the flange. Still other modifications which fall within the scope of the present invention will be apparent to those skilled in the art, in light of a review of this disclosure, and such modifications are intended to fall within the appended claims.

What is claimed is:

1. A method of providing an outside rotor electric machine having a reduced radial air gap variation across an axial length of the air gap, the machine including a rotor having a cylindrical elongated portion supporting magnets and a flange extending at least partially radially from a rotating shaft, the method comprising increasing a radial deflection of the elongated portion in proximity of the flange by connecting the elongated portion to the flange through a radial spring having a stiffness lower than that of the elongated portion, such that a variation of the radial deflection throughout the length is maintained below a predetermined value when the rotor rotates at a maximum speed.

2. The method as defined in claim 1, wherein connecting the elongated portion to the flange through the radial spring comprises connecting the elongated portion to the flange through a cylindrical reduced thickness portion, the reduced thickness portion having a smaller thickness than that of the elongated portion and having axial surfaces free from contact with a remainder of the electric machine.

3. The method as defined in claim 2, wherein connecting the elongated portion to the flange through the reduced thickness portion is performed such that the reduced thickness portion has a thickness between about one half and about one third of that of the elongated portion.

4. The method as defined in claim 2, wherein connecting the elongated portion to the flange through the reduced thickness portion is performed such that the reduced thickness portion has a length of less than about 25% of that of the elongated portion.

5. The method as defined in claim 1, wherein connecting the elongated portion to the flange through the radial spring is performed such that the variation of the radial deflection is maintained to between about 0.001 inch and about 0.003 inch.

6. The method as defined in claim 1, wherein connecting the elongated portion to the flange through the radial spring comprises connecting the elongated portion to the flange through an axially oriented U-shaped portion.

7. A method of reducing a variation of a radial air gap in an outside rotor electric machine across a length of the air gap during use, the machine including a rotor having a cylindrical elongated portion supporting magnets and a flange extending at least partially radially from a rotating shaft, the elongated portion having a free end and an opposed connected end connected to the flange, the method comprising providing a connection between the connected end and the flange having axial surfaces free from contact with a remainder of the electric machine, and increasing a flexibility of the connection between the connected end and the flange until a difference between a radial deflection of the elongated portion in proximity of the connected end and the radial deflection of the elongated portion in proximity of the free end when the rotor rotates at a maximum speed is within a predetermined range.

8. The method as defined in claim 7, wherein providing the connection comprises providing a cylindrical reduced thickness portion between the connected end and the flange, the reduced thickness portion having a thickness smaller than that of the elongated portion and the axial surfaces free from contact with the remainder of the electric machine.

9. The method as defined in claim 8, wherein the cylindrical reduced thickness portion is provided such that the thickness of the reduced thickness portion is between about one half and about one third of that of the elongated portion.

10. The method as defined in claim 8, wherein the cylindrical reduced thickness portion is provided such that a length of the reduced thickness portion is less than about 25% of that of the elongated portion.

11. The method as defined in claim 7, wherein increasing the flexibility of the connection is performed such that the difference between the radial deflection of the elongated portion in proximity of the connected end and the radial deflection of the elongated portion in proximity of the free end is between about 0.001 inch and about 0.003 inch.

12. The method as defined in claim 7, wherein increasing a flexibility of the connection comprises providing an axially oriented U-shaped portion between the connected end and the flange.

13. A method of decreasing a conicity of a radial deflection of an outside rotor of an electric machine during use, the rotor including a cylindrical elongated portion supporting magnets and a flange extending at least partially radially from a rotating shaft, the method comprising providing a connection between the connected end and the flange having axial surfaces free from contact with a remainder of the electric machine, and increasing a flexibility of the connection between the elongated portion and the flange until a radial deflection of the elongated portion in proximity of the flange is within a predetermined limit of the radial deflection of the elongated portion at an end thereof opposite of the flange when the rotor rotates at a maximum speed.

14. The method as defined in claim 13, wherein providing the connection comprises providing a cylindrical reduced thickness portion between the elongated portion and the flange, the reduced thickness portion having a thickness smaller than that of the elongated portion and the axial surfaces free from contact with the remainder of the electric machine.

15. The method as defined in claim 14, wherein the cylindrical reduced thickness portion is provided such that the thickness of the reduced thickness portion is between about one half and about one third of that of the elongated portion.

16. The method as defined in claim 14, wherein the cylindrical reduced thickness portion is provided such that a length of the reduced thickness portion is less than about 25% of that of the elongated portion.

17. The method as defined in claim 13, wherein increasing the flexibility of the connection is performed such that the radial deflection of the elongated portion in proximity of the flange is within between about 0.001 inch and about 0.003 inch of the radial deflection of the elongated portion at the end thereof opposite of the flange.

18. The method as defined in claim 13, wherein increasing a flexibility of the connection comprises providing an axially-oriented U-shaped portion between the elongated portion and the flange.

* * * * *